Oct. 6, 1959     E. F. MACKS     2,907,304
FLUID ACTUATED MECHANISM

Filed April 4, 1957     2 Sheets-Sheet 1

INVENTOR.
ELMER FRED MACKS
BY Pyle & Fisher
ATTORNEYS

INVENTOR.
ELMER FRED MACKS
BY Pyle & Fisher
ATTORNEYS

# United States Patent Office 2,907,304
Patented Oct. 6, 1959

2,907,304

FLUID ACTUATED MECHANISM

Elmer Fred Macks, Vermillion, Ohio

Application April 4, 1957, Serial No. 650,727

12 Claims. (Cl. 121—38)

This invention pertains to fluid actuators relating more specifically to the art of piston and housing mechanisms which convert fluid pressure into rectilinear motion.

Many recently developed mechanisms require devices for producing rectilinear motion under extreme conditions of temperature, pressure and speed. Often, these conditions are so severe as to prohibit the use of most prior known lubricants. Prior known lubricants under extremes of temperature will, as is well known, lose their lubricating characteristics. Under some conditions the lubricant itself may be completely destroyed.

It will be apparent that under the foregoing conditions when the lubricating characteristics are reduced, wear between relatively moving parts will become excessive. Even with the best lubricants wear experienced by relatively moving parts in sliding contact will be excessive when extremes of temperature and speed are present.

It has been discovered that the relatively moving parts can be retained indefinitely in spaced relationship without contact. This is accomplished by providing a thin film of fluid under pressure between the relatively moving surfaces.

Accordingly, one of the principal objects of this invention is to provide a novel and improved piston and housing arrangement in which the piston and housing are held out of contact under wide extremes of temperature, pressure, and speed.

A further object of this invention is to provide a novel and improved piston and housing arrangement device in which a supply of fluid under static pressure is passed through a foraminous housing wall to provide such a supporting film of fluid.

An additional object of this invention is to provide a fluid actuator in which fluid under pressure is passed through the foraminous housing wall and in which relative reciprocal motion of the piston and housing is obtained at least in part by controlling the escape of fluid under pressure from the housing chamber after it has passed through the foraminous wall.

Another object of this invention is to provide a device in which fluid under pressure is passed through the foraminous housing wall to provide a separating and piston supporting film of fluid and in which additional fluid under pressure is selectively provided to one or both ends of the housing chamber to drive the piston in relative reciprocal motion.

A further object of this invention is to provide a fluid motor which is a servo mechanism in which the piston and housing may be held in fixed relative position rectilinearly speaking and at the same time out of actual physical contact with one another for an indefinite period of time.

The foregoing objective is achieved by providing a supply of fluid under static pressure which is constantly permitted to escape in a controlled fashion. This constant escape provides a constant flow of fluid between complemental surfaces of the piston and the housing. Since the fluid is constantly flowing, a load carrying fluid film is provided between the said piston and housing surfaces. This load carrying fluid film will hold the said surfaces in spaced relationship preventing physical contact.

In my copending application for patent, Serial No. 575,185 filed March 30, 1956, under the title "Fluid Supported Device," a piston and cylinder arrangement has been disclosed. In that disclosure a piston having a foraminous wall is employed. Fluid pressure derived from a pressure chamber is utilized to hold the piston in spaced relationship with the cylinder wall. In that device, fluid under pressure must be present within the cylinder to hold the piston in spaced relationship with the cylinder.

Accordingly, one of the principal objects of the present invention is to provide a device in which the piston and cylinder may be held in non-touching relationship even when there is nothing to restrict the escape of fluid from the cylinder.

A further object of this invention is to provide a device in which an inherently self-balancing fluid film is provided between the piston and the housing to hold the piston and housing in constant spaced relationship.

Yet another object of this invention is to provide a fluid motor in which the piston and housing are held in constant spaced relationship to completely eliminate frictional wear.

Still another object of the invention is to provide a fluid motor in which the piston may be of any radial cross sectional configuration to prevent rotation relative to the housing, for facilitation of construction and for other reasons.

A further object of the invention is to provide a piston and housing arrangement made in accordance with the present invention in which a lock is utilized to aid in holding the piston and housing in a selected relative position.

An additional object of the invention is to provide such an improved fluid actuator in which fluid pressure is utilized to drive the piston in a work performing direction and a spring is utilized to urge the piston in its return direction.

The fluid employed in the subject mechanism may be a gas or a liquid. In order to meet present day high temperature requirements (above 600° F.), it is necessary that the "lubricating" fluid be a gas. When gas is employed the mechanism is not limited in temperature, the friction during relative motion is truly negligible, and the device is extremely efficient. In addition physical contact does not occur between the relatively moving complemental surfaces of the piston and cylinder and wear is no problem even at extreme speeds and pressures. Gas is the preferred fluid to be employed except where the compressibility characteristics thereof prevent its use.

Other objects and a fuller understanding of the invention may be had by referring to the following specification and claims, taken in conjunction with the accompanying drawings, in which:

Figure 1:
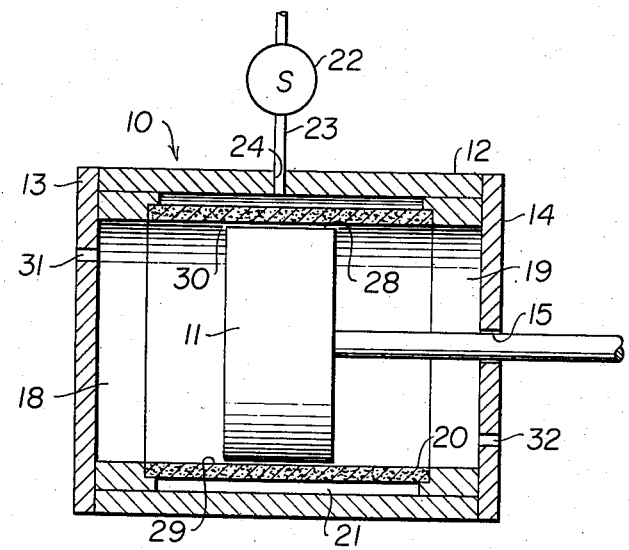
Figure 1 is a cross sectional view of a piston and housing made in accordance with the teaching of the present invention.

Referring to the drawings, a fluid motor is shown generally at 10. A piston 11 is carried by a housing center section 12 for relative reciprocal movement. The center section 12 is closed at its first end by first end closure 13. The center section 12 is closed at its second end by a second end closure 14. The center section 12 and the end closures 13, 14 together define a housing. The housing defines variable volume fluid chambers 18, 19 on either side of the piston 11.

A piston rod 16 is carried by the piston 11. An aperture is provided in the housing. In the embodiment shown the aperture takes the form of an opening 15 in the second end enclosure 14. The piston rod 16 projects through the aperture 15.

A foraminous sleeve 20 is carried by and forms a part of the housing center section 12. The foraminous sleeve 20 is a permeable sleeve such as of sintered metal powder. The sleeve in the disclosed embodiment forms compensating fluid conduction means to permit a restricted flow of fluid under pressure. The function of the sleeve will subsequently be described in more detail. A fluid cavity 21 is defined by the sleeve 20 and the center section 12.

A source of fluid under static pressure 22 is provided. The source of pressure 22 communicates with the cavity 21 through conduit 23. The communication of the conduit 23 and the cavity 21 is completed through aperture 24 in the center section 12.

The piston 11 has a smooth outer surface 28. A complemental surface 29 is provided. The complemental surface 29 is a smooth inner surface on the center section 12 and the sleeve 20. The surface 29 is symmetrically disposed about the piston surface 28.

An axial cross section of either of the surfaces 28, 29 will reveal a line which is parallel to the axis of the fluid motor. For convenience in manufacture the surfaces 28, 29 will generally be cylindrically contoured. However, one of the outstanding features of this invention is that the practical considerations which generally dictate cylindrical contour in fluid motors are by and large eliminated. By this it is meant that one of the prime reasons for constructing prior known fluid motors in cylindrical form was to avoid the problem of preventing fluid leakage in corners. As will be apparent, from the subsequent, more detailed discussion of the fluid film provided in the present disclosed device, this prime reason has been eliminated. One of the outstanding features of the invention is that the radial cross section of the piston may be of any contour so long as the complemental surface 29 is symmetrical to the piston surface 28 and closely spaced. When the supporting fluid is a gas the operating radial dimension of the fluid region will be in the order of from 0.000050 inch to 0.0009 inch per inch of radial dimension. When the supporting fluid is a liquid such as SAE 20 oil the operating radial dimension will be from 0.0005 to 0.005 per inch of radial dimension.

It is thus apparent that many indirect advantages are obtainable. Relative rotation of the piston and housing may be prevented. Ready assembly other than by rectilinear insertion of the piston in the housing is possible. Other advantages will be apparent to one skilled in the art.

The complemental surfaces 28, 29 define a fluid film region 30 therebetween. When the device is in operation, a load carrying fluid film is developed in the region.

For clarity of illustration of the inventive principles of this fluid actuator, the valve controls have been eliminated from Figure 1. In describing the principles whereby the surfaces 28, 29 are held out of contact, it is only necessary that aperture 31 in the end wall 13 and aperture 32 in the end wall 14 be considered. The piston and housing surfaces 28, 29 may be held in spaced relationship at all times so long as fluid is able to flow through the foraminous support body 20 in the region 30. Thus in all cases the fluid pressure in the variable volume chambers 18, 19 is less than in the cavity 21. During operation the apertures 31, 32 may permit either escape or entry of pressurized fluid. For example, if a push force on rod 16 is desired fluid pressure enters chamber 18 through aperture 31 as well as through foraminous sleeve 20. Simultaneously fluid escapes through aperture 32 and piston rod clearance at 15. If a pull force on rod 16 is desired, pressurized fluid enters chamber 19 through aperture 32 and foraminous sleeve 20 and escapes from aperture 31. The action in both cases is controlled by valving such as that shown in Figure 2.

Figure 2:
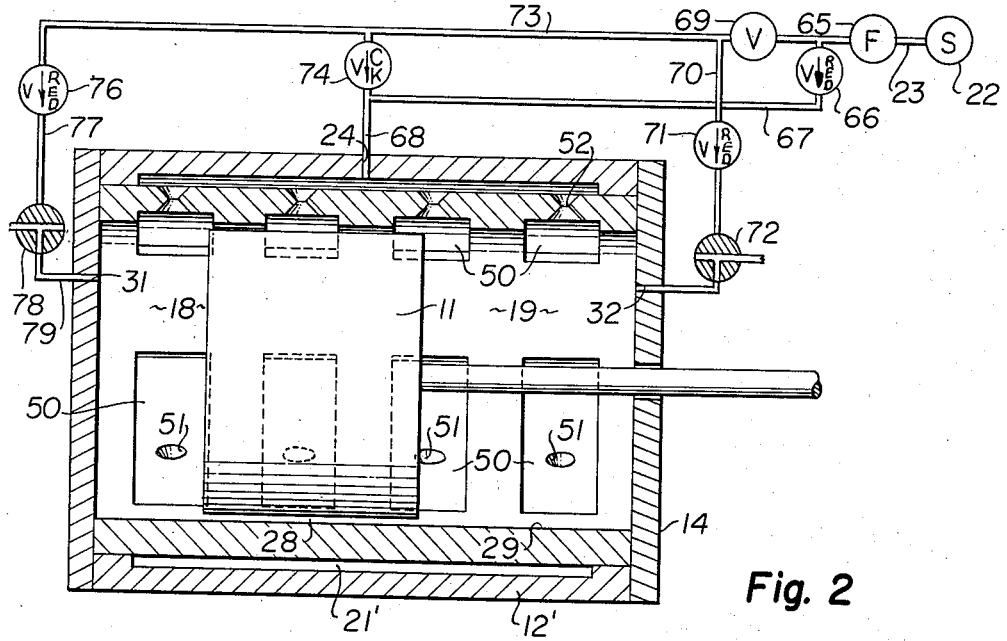
Figure 2 is a schematic diagrammatic view showing a cross sectional view of a piston and housing made in a slightly modified form with respect to Figure 1, and also showing a schematic view for providing fluid under pressure to the fluid motor and a lock to aid in holding the piston and housing in a selected relative position.

In the control mechanism of Figure 2 a filter 65 is placed in the supply line 23. Fluid is conducted from the filter 65 to a one way pressure reducing valve 66 and thence through conduits 67, 68 to the aperture 24. A control valve 69 is connected in series with the filter 65 and conduit 73. When control valve 69 is in a closed position, fluid is supplied to the cavity 21' through the pressure reducing valve 66. At such times, the passage 31 and/or the passage 32 is connected to the atmosphere in a fashion which will subsequently be described in more detail. With the passages 31, 32 so connected and the valve 69 closed, the piston is held out of contact with the surface 29 by a very minimal flow of fluid through the valve 66. When it is desired to activate the piston, the valve 69 is opened to supply fluid under pressure to a check valve 74 interposed between the conduits 68, 73. It will be seen that the check valve 74 permits the flow of fluid from the conduit 73 to the conduit 68, but prevents flow in a reverse direction. Thus, when fluid is being bled through the reducer valve 66 with the valve 69 closed, a check valve 74 prevents escape of such fluid through the conduit 73.

A pressure reducing valve 76 is connected to the conduit 73. A two-way bleed and control valve 78 is interposed between the reducing valve 76 and the aperture 31. Conduits 77, 79 connect the valve 78 to the reducing valve 76 and the aperture 31 respectively.

A pressure reducing valve 71 is connected in series with conduit 70 and two-way control valve 72 to the aperture 32. It will be seen that the valves 72, 78 are positioned to connect the apertures 32, 31 respectively to the atmosphere when the valve 69 is closed. They may also be retained in that position when the valve 69 is opened. It will also be seen that the purpose of the check valve 74 is to permit an increase of pressure in the cavity 21 when the valve 69 is open, so that sufficient pressure is supplied to maintain the piston 11 out of contact with the housing wall 29 when pressure is introduced through either the aperture 31 to move the piston to the right, or the aperture 32 to move the piston to the left.

In the operation of the device of Figure 2, fluid under pressure from the supply 22 passes through the one way pressure reducing valve 66 and thence into the chamber 21'. When the control valve 69 is opened piston reciprocation can be controlled by manipulation of two-way valves 72, 78. The two-way valve 72 may be adjusted to connect the pressure reducing valve 71 to the chamber 19. By manipulation of the valve 72 flow is stopped through the pressure reducing valve 71 and fluid may be bled from the chamber 19. The valve 78 corresponds to the valve 72 and controls the flow through valve 76 and the pressure in chamber 18 in the same manner as the valve 71 and chamber 19 are controlled. When the conduit 77 is connected to the conduit 79 by adjustment of the valve 78, fluid under pressure is introduced into the cavity 18 which will cause the piston to shift to the right. Conversely, connection of the conduit 70 to the aperture 32 by manipulation of the valve 72, will introduce fluid under pressure to the chamber 19 to cause the piston to shift to the left. In this construction either the valve 72 or the valve 78, or both, must connect one of the apertures 32, 31 to the atmosphere at all times when it is desired to hold piston 11 out of contact with the wall 29. Maintenance of the piston out of contact with the wall 29 is dependent on fluid flow from the region defined by the surfaces 28, 29. This can only be accomplished when one, or both, of the valves 72, 78 connects one of the chambers to the atmosphere.

The fluid actuators may be employed in two basic ways. The first is with intermittent support pressure in cavity 21. The intermittent pressure is supplied only in anticipation of piston motion. The second is with continuous support pressure in cavity 21. Continuous pressure is used to eliminate vibrational wear, such as fretting corrosion.

Referring again to Figure 1, fluid under pressure is introduced into the cavity 21. The fluid then passes through the foraminous sleeve 20. Since the foraminous sleeve provides a restricted path for fluid flow, a pressure drop is experienced as the fluid passes through the wall into the tubular chamber defined by the surface 29. Wherever the surface 29 is confronted by the surface 28 a load carrying fluid film will be developed in the region 30. This is true since the escape of fluid is somewhat restricted by the surface 28. Fluid will escape axially outwardly from the region 30. Thus, the flow through the foraminous wall 20 into the region 30 will be less than the flow in other areas of the foraminous wall. Since the flow is reduced the pressure drop is reduced. Since the pressure drop is reduced a pressurized load carrying fluid film is developed in the region 30.

If the load is eccentric the piston will tend to move closer to the surface 29 on one side than the other. For example, if reciprocal movement is horizontal, the weight of the piston will then tend to bring it closer to the surface 29 at the bottom. The closer the piston moves to the surface 29, the more limited is the escape of fluid in that portion of the region 30. This is true since the radial dimension in the supporting fluid film in that portion is reduced. Since the axial escape of fluid is thus reduced, the flow of fluid through the foraminous wall in this portion is reduced. Since the flow of fluid is reduced the pressure drop will be less, and therefore there will be an immediate rise in pressure in this portion of the fluid region 30. It will thus be apparent that the device is an inherently self-balancing mechanism which provides a load carrying fluid film having its greatest load carrying capacity in the area of greatest load.

The self-balancing load carrying film is one of the outstanding features of the invention for yet another reason. Since the surfaces 28, 29 do not contact one another when the device is in operation, all wear on these surfaces is eliminated even when no "lubricant" other than gas is provided.

Figure 3:
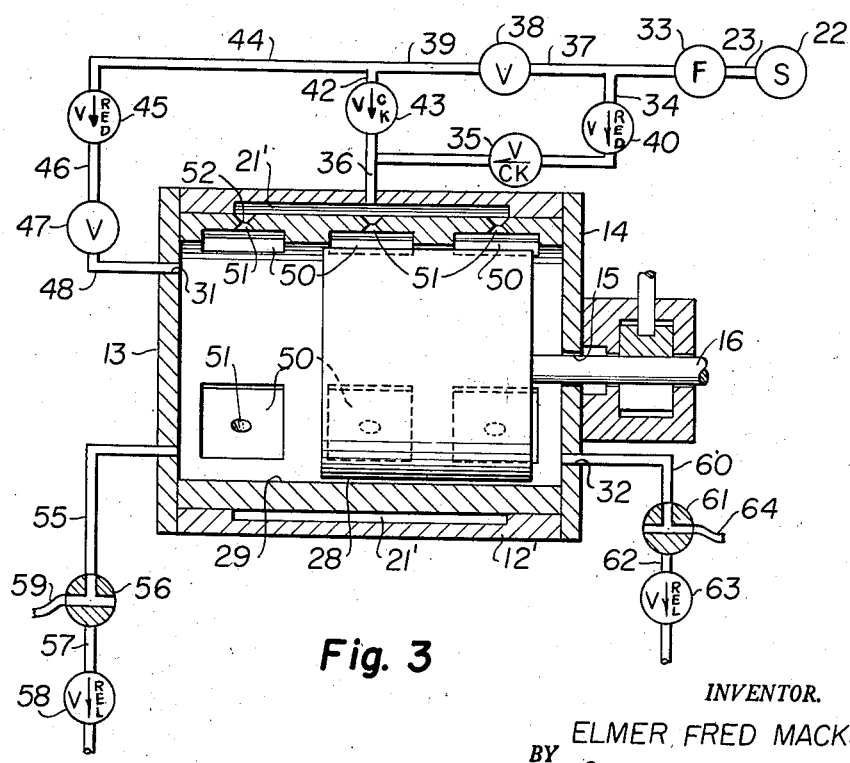
Figure 3 is a schematic diagrammatic view of the device of Figure 2 showing another fluid actuating and control mechanism.

In Figure 3 a fluid actuator and control mechanism is shown schematically. The disclosed mechanism is a preferred mechanism, but it must be understood that it is illustrative. In order for the disclosed mechanism to work, it is only necessary that the fluid escape from either end of the chamber before the pressure has reached the level of the pressure in the cavity 21. In order for the device to reciprocate, there must also be provided means to control the pressure at one end of the housing. If a constant load is applied as indicated at L, then control of fluid pressure at the end 13 is all that is required. If a load is not applied to the piston rod 16 to drive the piston 11 to the left, as seen in Figure 3, then, of course, there must be means to control the fluid pressure at the second end 14.

A filter 33 may be connected to the fluid supply line 23. A conduit 34 connects the filter 33 to pressure reducer 40 and to check valve 35. The check valve 35 is in turn connected to a pressure-cavity 21' by conduit 36. Fluid under pressure passes through the check valve 35 to supply constant pressure to the cavity 21'. This will hold the piston 11 out of contact with the surface 29.

A control valve 38 is connected to the supply line 34 through conduit 37. When the control valve 38 is closed, the pressure reducing valve 40, the check valve 35 and the connected conduit 34 together serve the same function as the pressure reducing valve 66 and the conduit 67. That is, they permit the piston 11 to be retained out of contact with the housing wall 29. If it is desired to actuate the piston, the control valve 38 is opened to pass fluid under pressure through conduit 39. Fluid under pressure may be conducted through conduit 42 to check valve 43. The check valve 43 is connected to the conduit 36. The check valve 35 may be of substantially lower pressure activation than the check valve 43. Thus, when the device is at rest as a servo mechanism, for example, the check valve 35 will bleed minimal amounts of fluid into the chamber 21'. When fluid under relatively great pressure is to be introduced into the chamber defined by the surface 29, then it is necessary to increase the pressure in the chamber 21'. Thus, when the valve 38 is opened fluid under increased pressure is passed through the check valve 43.

The pressure reducer 45 is connected to a piston activating control valve 47 by conduit 46 and to the supply by conduit 44. The valve 47 in turn is connected to the end closure 13 by conduit 48.

A first escape control valve 56 is connected to the end closure aperture 31 by conduit 55. The escape control valve 56 may be a two-way valve. A pressure reducing valve 58 is connected to the valve 56 by conduit 57. A conduit 60 is connected to the aperture 32. Valves 61, 63 and conduit 62 are connected in series to the conduit 60. The conduits 60, 62 and the valves 61, 63 function identically to the conduits 55, 57 and the valves 56, 58 respectively.

In operating the device of Figure 3, the valves 56, 61 are first positioned to connect the conduits 55, 57 and 60, 62 respectively. Next, with the valve 38 closed, or not provided, fluid is passed through the check valve 35 into the cavity 21'. Fluid then is passed through passages 51, having restricting orifices 52, into shallow recesses 50. The recesses 50, the passages 51, each of which has one of the restricting orifices 52, are shown to illustrate that other forms of compensating fluid conduction can be used in addition to the foraminous sleeve 20 shown in Figure 1. As examination of Figures 2 and 3 will reveal, there are a plurality of sets of longitudinally spaced recesses 50. The sets are circumferentially spaced and at least three such sets are provided in order that the piston 11 can be located and supported out of contact with the wall 29.

As the fluid is bled into recesses 50 a load supporting fluid film is built up in the fluid region 30. Fluid gradually collects, under pressure, on both sides of the piston 11. When the pressure reaches a preselected level, check valve 58 will open and fluid can escape from the left hand side of the piston. When pressure to the right of the piston reaches a selected point the check valve 63 will open.

To illustrate the operation, let us suppose that fluid under 500 pounds per square inch pressure is provided at the supply 22. The check valve 35 may, for example, provide fluid to the cavity 21 under 250 pounds per square inch pressure. Let us also suppose a load of 100 pounds applied at L. Assume that the piston has a cross sectional area of one square inch. The pressure relief valve 58 may then be set, for example, at 150 pounds pressure, and the pressure relief valve 63 at 50 pounds pressure. A pressure of 50 pounds per square inch will be developed to the right of the piston 11 and a pressure of 150 pounds per square inch to the left. It will be seen that since the load plus the pressure applied on the right hand side of the piston equals the pressure applied on the left hand side, the piston will remain stationary. Upon manipulation of the valve 56 to the position shown in Figure 3 to permit fluid to escape through conduit 59 the pressure will be released from the left hand side of the piston. The conduit 59 may, for example, communicate with the ambient atmosphere. When the valve 56 has been thus manipulated, the combination of the load and the pressure to the right of the piston will drive the piston to the left.

Conversely, adjusting valve 61 to connect the conduit 60 with conduit 64 to the position shown in Figure 3 will permit fluid on the right hand side of the piston to escape and cause the piston to move to the right.

The mechanism disclosed and identified by numbers 38 through 48 is both an alternate and a complemental means of controlling reciprocation. If this latter mechanism is used, the mechanism disclosed by the numbers 60 through 64 may be eliminated. It will be seen that the load will cause the piston to shift to the left when pressure is absent from the conduit 48. When the valves 38, 47 are opened pressure will be introduced into the conduit 48 which, providing the valve 56 is in the illustrated position, will drive the piston to the right.

In many applications it will also be possible to eliminate the mechanism identified by the numbers 55 through 59. Constant bleeding of fluid from the aperture 31 will serve.

It will also be seen that a mechanism may be operated with all the disclosed control valves and conduits. If such is the case, it is readily possible to provide a fluid actuator that is also a servo mechanism. The piston can be held in balance by the previously described functioning of the devices identified by numbers 55 through 64. The piston can be driven to the right by opening the valves 38, 47.

In Figure 4a lock casing 80 is mounted on the housing end wall 14. A suitable lock in the form of a friction clamp 81 is carried by the casing 80. An actuator 82 is provided to shift the clamp 81 into an out-of-contact position with the piston rod 16. The actuator 82 may be manually controlled or operated by suitable power means. It may be, for example, actuated through suitable controls by fluid under pressure from the supply 22.

Figure 4:
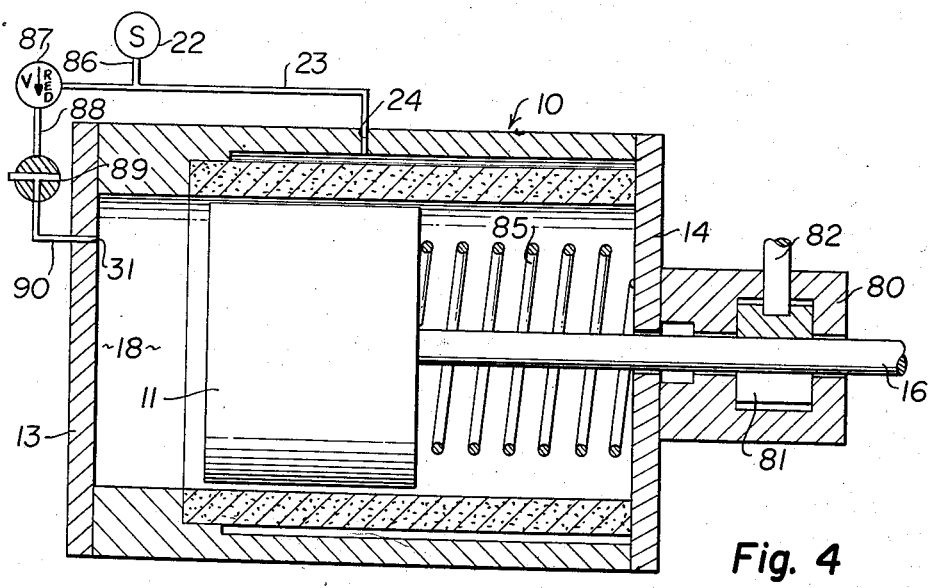
Figure 4 is similar to Figure 1 showing a device in which a spring is used to urge the piston during its return stroke and a lock is used to hold the piston and housing in selected relative positions.

The clamp is placed in the closed position of Figure 4 to prevent relative movement of the piston and cylinder when they are in a desired preselected position. When relative movement of the piston and cylinder are desired, the actuating arm 82 is moved upwardly with respect to Figure 4 to release the clamp 81 and permit the piston to reciprocate.

In Figure 4 a spring 85 is provided. The spring is under compression between the piston 11 and the housing end wall 14 to drive the piston toward the left as viewed in Figure 4.

A conduit 86 is connected to the fluid supply 22. A pressure reducing valve 87 is connected to the conduit 86. A two-way bleed and control valve 89 is connected by conduits 88, 90 to the pressure reducing valve 87 and the aperture 31 respectively. It will be apparent that manipulation of the valve 89 will provide fluid under pressure to the chamber 18 or selectively permit the escape of fluid from the chamber 18.

There has thus been described an improved fluid actuator, which is also a servo mechanism, in which the piston and housing are at all times kept out of physical contact when the device is in operation, in which a load carrying fluid film is developed between the piston and the housing to maintain such spaced relationship, and in which the load carrying fluid film is self-balancing. This device is particularly adapted to high temperature operation where the fluid is a gas.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. In a rectilinear motion mechanism, a housing having an inner surface defining a tubular chamber, a piston carried in the chamber, the piston and housing being relatively movable in a reciprocal manner, the piston having a smooth outer surface, the housing inner surface being symmetrically disposed about the piston surface in a close running fit, the housing having an aperture therein, a piston rod carried by the piston and projecting through the housing aperture, the housing including a foraminous wall having an inner surface coincident with at least a longitudinal portion of the housing inner surface, means to pass fluid under pressure through the foraminous wall into the chamber, and means to control the escape of such fluid from the chamber and thereby control relative movement of the piston and cylinder.

2. In a rectilinear motion mechanism, a housing having inner and outer sleeves defining a cavity therebetween, the inner sleeve being foraminous and having a smoothly contoured inner surface defining a tubular chamber, a piston carried in the chamber, the piston and housing being relatively movable in a reciprocal manner, the piston having a smooth outer surface, the housing inner surface being symmetrically disposed about the piston surfaces in a close running fit, the housing having an aperture therein, a piston rod carried by the piston and projecting through the housing aperture, the housing including a foraminous wall having an inner surface coincident with at least a longitudinal portion of the housing inner surface, means to introduce fluid under pressure to the cavity to pass through the foraminous wall into the chamber, and means to control the escape of such fluid from the chamber and thereby control relative movement of the piston and cylinder.

3. A servo mechanism for converting fluid pressure to rectilinear motion comprising, a housing, a foraminous sleeve carried by the housing, the sleeve having inner and outer surfaces, the housing and the sleeve outer surface defining a fluid cavity, the sleeve inner surface defining a tubular chamber having first and second ends, the housing including first and second chamber end closures, a piston carried in the chamber, the housing having an opening, a piston rod connected to the piston and disposed through the housing opening, the piston having an outer surface of a contour conforming to the sleeve inner surface, the piston and sleeve inner surface being in close association, pressure supply means for the introduction of fluid under pressure to the cavity, first pressure escape control means for the selective release of such fluid from the chamber first end, and second pressure escape control means for the selective release of such fluid from the chamber second end, said first and second pressure escape control means being selectively adjustable to cause the piston to reciprocate in the chamber.

4. A servo mechanism for converting fluid pressure to rectilinear motion comprising, a housing, a foraminous sleeve carried by the housing, the sleeve having inner and outer surfaces, the housing and the sleeve outer surface defining a fluid cavity, the sleeve inner surface defining a tubular chamber having first and second ends, the housing including first and second chamber end closures, a piston carried in the chamber, the housing having an opening, a piston rod connected to the piston and disposed through the housing opening, the piston having an outer surface of a contour conforming to the sleeve inner surface, the piston and sleeve inner surface being in close association, pressure supply means for the introduction of fluid under pressure to the cavity, pressure escape control means for the selective release of such supplied fluid from the chamber first end, and supply pressure control means to selectively control the introduction of fluid under pressure to the cavity from the pressure supply means, whereby to provide a device in which selective manipulation of the supply pressure control means and pressure escape control means will cause the piston to reciprocate selectively in the chamber.

5. A servo mechanism for converting fluid pressure to rectilinear motion comprising, a housing, a permeable sintered metal sleeve carried by the housing, the sleeve having inner and outer surfaces, the housing and the sleeve outer surface defining a fluid cavity, the sleeve inner surface defining a tubular chamber having first and second ends, the housing including first and second chamber end closures, a piston carried in the chamber, the housing having an opening, a piston rod connected to the piston and disposed through the housing opening, the piston having an outer surface of a contour conforming to the sleeve inner surface, the piston and sleeve inner surface being in close association, pressure supply means for the introduction of fluid under pressure to the cavity, first pressure escape control means for the selective release of such supplied fluid from the chamber first end, and second pressure escape control means for the selective release of such supplied fluid from the chamber second end, said first and second pressure escape control means being selectively adjustable to cause the piston to reciprocate in the chamber.

6. A servo mechanism for converting fluid pressure to rectilinear motion comprising, a housing, a foraminous sleeve carried by the housing, the sleeve having inner and outer surfaces, the housing and the sleeve outer surface defining a fluid cavity, the sleeve inner surface defining a tubular chamber having first and second ends, the housing including first and second chamber end closures, a piston carried in the chamber, the housing having an opening, a piston rod connected to the piston and disposed through the housing opening, the piston having an outer surface of a contour conforming to the sleeve inner surface, the piston and sleeve inner surface being in close association, pressure supply means for the introduction of fluid under pressure to the cavity, a first pressure relief valve communicating with the chamber first end, first valve means to selectively open and close the communication between the chamber first end and the first pressure relief valve, a second pressure relief valve communicating with the chamber second end, and second valve control means to selectively open and close the communication between the chamber second end and the second pressure relief valve.

7. A servo mechanism for converting fluid pressure to rectilinear motion comprising, a housing, a foraminous sleeve carried by the housing, the sleeve having inner and outer surfaces, the housing and the sleeve outer surface defining a fluid cavity, the sleeve inner surface defining a tubular chamber having first and second ends, the housing including first and second chamber end closures, a piston carried in the chamber, the housing having an opening in one of the said end closures, a piston rod connected to the piston and projecting through said housing end closure opening, the piston having an outer surface of a contour conforming to the sleeve inner surface, the piston and the sleeve inner surface being in close association, pressure supply means for the introduction of fluid under pressure to the cavity, first pressure escape control means for the selective release of such supplied fluid from the chamber first end, and second pressure escape control means for the selective release of such supplied fluid from the chamber second end, said first and second pressure escape control means being selectively adjustable to cause the piston to reciprocate in the chamber.

8. A servo mechanism for converting fluid pressure to rectilinear motion comprising, a housing, a foraminous sleeve carried by the housing, the sleeve having inner and outer surfaces, the housing and the sleeve outer surface defining a fluid cavity, the sleeve inner surface defining a tubular chamber having first and second ends, the housing including first and second chamber end closures, a piston carried in the chamber, the housing having an opening, a piston rod connected to the piston and disposed through the housing opening, the piston having an outer surface of a contour conforming to the sleeve inner surface, the piston and sleeve inner surface being in close association, pressure supply means for the introduction of fluid under pressure to the cavity, first and second pressure relief valves, first and second control valves, first conduit means connecting said first valves in series with said first chamber end, said first control valve being selectively positionable in first and second positions, the first pressure relief valve being connected to the chamber when the first control valve is in its first position, the first control valve second position being for substantially unrestricted escape of fluid from the pressure chamber, and second conduit means connecting said second valves in series with said second chamber end, said second control valve being selectively positionable in first and second positions, the second pressure relief valve being connected to the chamber when the second control valve is in its first position, the second control valve second position being for substantially unrestricted escape of fluid from the pressure chamber.

9. A servo mechanism, comprising, a housing having a smooth inner surface defining a tubular chamber, the chamber having first and second ends, a piston carried in the chamber, the piston having a smooth outer surface, the housing surface being symmetrically disposed about the piston surface in a close running fit, an aperture in the housing, a piston rod carried by the piston and projecting through the aperture, the housing including a foraminous portion having a smooth inner surface forming at least part of the housing inner surface, fluid supply means, fluid conduction means to pass fluid under pressure from said supply means through the foraminous wall, selective means to conduct fluid under pressure from said supply means to said chamber first end and to drive the piston toward said chamber second end, and escape means to permit the constant escape of fluid from such chamber when fluid is passed through said foraminous wall.

10. In a rectilinear motion mechanism, a housing having an inner surface defining a tubular chamber, a piston carried in the chamber, the piston and housing being relatively movable in a reciprocal manner, the piston having a smooth outer surface, the housing inner surface being symmetrically disposed about the piston surface in a close running fit, the housing having an aperture therein, a piston rod carried by the piston and projecting through the housing aperture, the housing including a foraminous wall having an inner surface coincident with at least a longitudinal portion of the housing inner surface, fluid pressure supply means, conduction means to pass fluid from said supply means through the foraminous wall, clamp means operably carried by the mechanism to selectively hold the piston and housing in a fixed relative position, and release the piston and housing for relative movement, and control means connecting said supply means to said chamber for selectively causing relative movement of said piston and cylinder when said clamp means is released.

11. In a rectilinear motion mechanism, a housing having an outer body and a tubular inner foraminous sleeve, the body and sleeve defining a fluid cavity therebetween, the housing also having first and second end closures, the end closures and the sleeve together defining a housing chamber, a piston reciprocably carried in the chamber, said housing having an aperture therein, a piston rod connected to the piston and projecting through the aperture, fluid supply means, first and second fluid conduction means forming parallel connections between the fluid supply means and the cavity, the first fluid supply means, including pressure reduction means to provide fluid under relatively low pressure to the cavity for passage through the foraminous sleeve to maintain the piston in a floating position out of contact with the sleeve, third fluid conduction means connecting the fluid supply means to the chamber, a control valve interposed between the supply means and both the second and third fluid conduction means, said second fluid conduction means supplying the cavity with relatively high fluid pressure when the valve is in an open position, supply control means for selective control of the flow of fluid through said third supply means, and first and second outlet control means connected to the first and second ends of the chamber respectively, each of said outlet control means having a first adjustment position for direct release of fluid under pressure from the chamber, and each of said outlet control means having a second adjustment position which permits the escape of fluid from said chamber only if it exceeds a preselected pressure whereby to provide a device in which a piston is constantly held in floating relationship out of contact with the sleeve by fluid supplied through the first and second conduction means, and in which relative rectilinear movement of the piston and chamber is obtained by selective positioning of the third fluid supply control means and the first and second outlet control means, and whereby to provide a device in which a single source of fluid supply provides fluid under pressure for both lubrication for causing relative movement of the piston and housing.

12. In a rectilinear motion mechanism, a housing having an inner surface defining a tubular chamber, a piston carried in the chamber, the piston and housing being relatively movable in a reciprocal manner, the piston having a smooth outer surface, the housing inner surface being symmetrically disposed about the piston surface in a close running fit, the housing having an aperture therein, a piston rod carried by the piston and projecting through the housing aperture, the housing including a foraminous wall having an inner surface coincident with at least a longitudinal portion of the housing inner surface, fluid supply means, conduction means to pass fluid from said supply means through the foraminous wall, a spring operably connected to the piston and the housing to urge the piston in the one direction, and control means connected to said fluid supply means and to said chamber to provide fluid under pressure to urge the piston in the other direction against the action of the spring.

References Cited in the file of this patent

UNITED STATES PATENTS

| | | |
|---|---|---|
| 1,469,006 | Lewis | Sept. 25, 1923 |
| 1,503,280 | Osbourne | July 29, 1924 |
| 1,634,768 | Bonner | July 5, 1927 |
| 2,696,410 | Topanelian | Dec. 7, 1954 |

FOREIGN PATENTS

| | | |
|---|---|---|
| 607,601 | France | Mar. 29, 1926 |